UNITED STATES PATENT OFFICE.

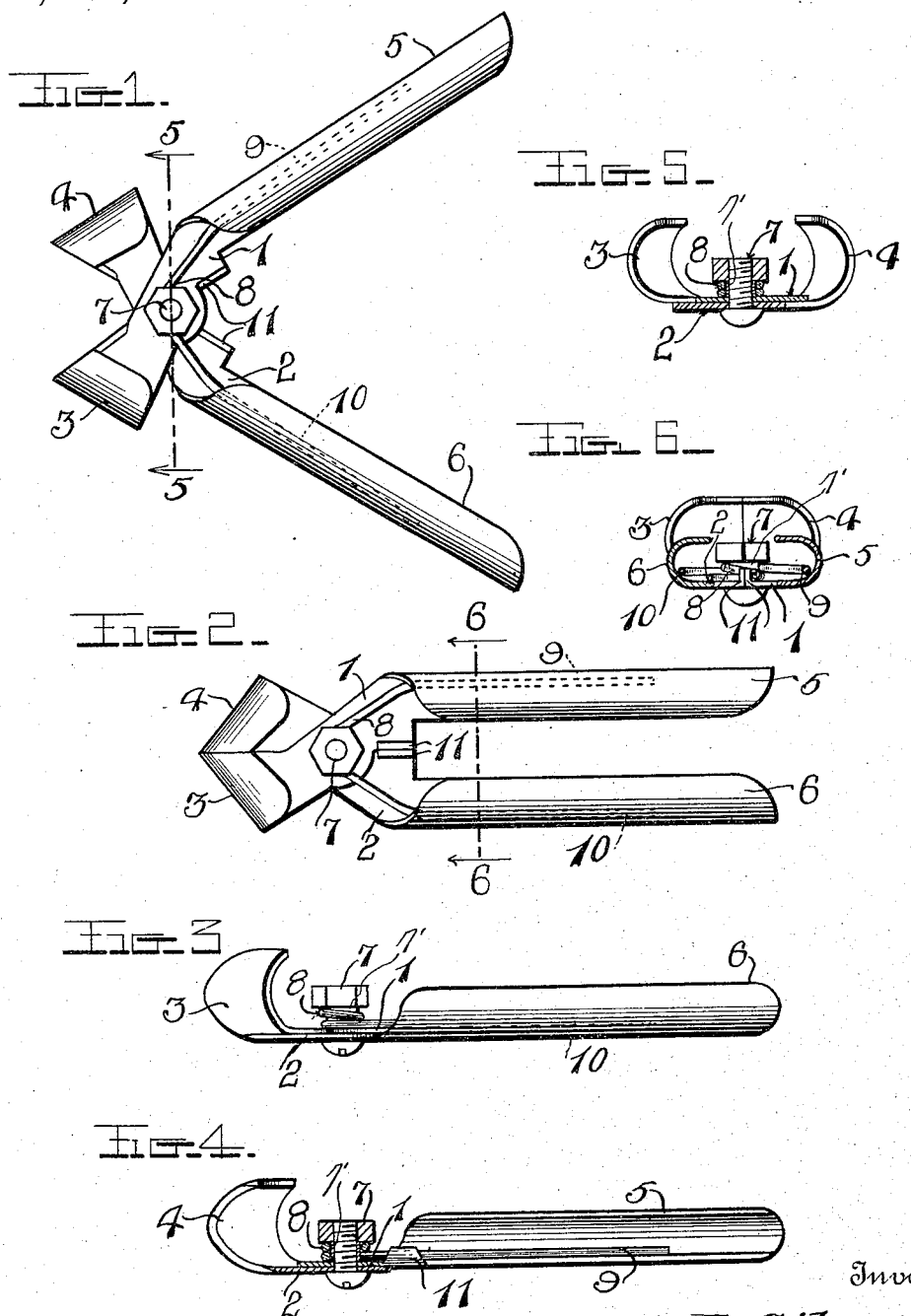

THOMAS E. SILVEAR, OF APTOS, CALIFORNIA.

FRUIT-CLIPPER.

1,170,353.  Specification of Letters Patent.  Patented Feb. 1, 1916.

Application filed June 24, 1915. Serial No. 36,080.

*To all whom it may concern:*

Be it known that I, THOMAS E. SILVEAR, a citizen of the United States, residing at Aptos, in the county of Santa Cruz and State of California, have invented certain new and useful Improvements in Fruit-Clippers; and I do declare the following to be a full, clear, and exact description of the invention, such as will enable others skilled in the art to which it appertains to make and use the same.

This invention relates to improvements in stemming or capping devices for strawberries and other fruit.

The object of the invention is to provide a device of this character in the form of clippers which while simple in construction are positive in operation, facile and convenient in use and by the use of which bruising of the fruit is prevented during the stemming or capping operation thereof.

Another object is to provide a clipper of this character so constructed that while easily brought into position for clipping the stems or caps from fruit will not interfere with the view of the part being cut by the operator.

With these and other objects in view, the invention consists of certain novel features of construction, and the combination and arrangement of parts as will be more fully described and claimed.

In the accompanying drawings: Figure 1 represents a top plan view of this improved clipper with the jaws shown in open position; Fig. 2 is a similar view with the jaws in closed position; Fig. 3 is a side elevation thereof; Fig. 4 is a longitudinal section thereof; Fig. 5 is a transverse section taken on the line 5—5 of Fig. 1; Fig. 6 is a similar view taken on the line 6—6 of Fig. 2.

In the embodiment illustrated this improved clipper comprises two overlapping pivoted members 1 and 2 which are respectively provided with jaws or blades 3 and 4 at one end and with handles 5 and 6 between which and said blades the members are pivotally connected by a bolt or screw 7. Tension means in the form of a spring 8 is disposed between the handles 5 and 6 and normally urge the jaws apart. This spring 8 is here shown coiled around the pivot 7 of the members 1 and 2 and have arms 9 and 10 diverging and extending into the handles 5 and 6 which are made hollow and constructed in a manner hereinafter to be described. A metal tube 7' surrounds the bolt 7 and is arranged between the spring and the bolt and affords rigidity to the appliance and prevents it from becoming loose.

The members 1 and 2 are preferably constructed of heavy sheet metal strips nickel plated or otherwise finished and overlapping each other near one end where they are pivotally connected in a manner similar to a pair of scissors. The shorter ends of these strips or members 1 and 2 have their free ends rolled inwardly from their pivots to form the jaws 3 and 4, the inner edges of said jaws being obliquely inclined and outwardly curved as shown in Figs 1 and 2 with the edges thereof beveled to provide sharp cutting blades. By curving these edges outwardly and bending the blades upwardly, the jaws form when closed a substantially V-shaped head, the meeting or cutting edges being arranged to form a nipper-like pair of blades so shaped that they will readily grip and remove a strawberry cap or stem without injuring the fruit, and they may be so inserted in the cavity around the stem of an apple or orange and said stem removed without breaking the skin or otherwise bruising the fruit. The inner edges of the members 1 and 2 beyond their pivotal connection are provided with laterally extending flanges 11 which are designed to form stops for limiting the closing movement of the jaws or blades and prevent them from becoming distorted.

The handles 5 and 6 are of considerable extension, forming a convenient and efficient means for gripping and holding the clippers and are here shown substantially in the form of split hollow cylinders with the open portions arranged on the inner sides of the handles, the spring arms 9 and 10 being disposed within said handles and engaging the outer walls thereof.

In using the clippers the curved ends of the jaws may be disposed upwardly or downwardly, the device operating equally well when turned in either direction, said jaws being here shown with the curved free ends disposed upwardly, and when the jaws are in closed relation the curved cutting edges thereof will form a rounded point and thereby prevent injury to any object with which the clippers may be brought into contact. This peculiar construction of the jaws especially adapts them for use in capping strawberries, removing the stems from apples, oranges or the like which have a cavity around the stems, and which produces a clean quick cut enabling the operator to proceed rapidly in the cutting operation.

The entire device as organized is adapted for the performance of its functions with the highest speed and efficiency, and meets with all the conditions of service which are imposed upon a device of the class of the character under consideration.

I claim as my invention:

1. A clipper of the class described comprising two pivoted members which are rolled at one end toward the pivot thereof to form jaws, the connecting or meeting edges of which are obliquely disposed to form a curved pointed nose when the jaws are closed.

2. A clipper composed of two pivotally connected coöperating members, each of which is formed of a strip of sheet metal having one end rolled toward its pivot point to form a hollow connecting jaw, the meeting edges of said jaws being obliquely disposed and sharpened to form cutting blades, said members having laterally extending flanges arranged at the rear of their pivotal connection to form stops for limiting the closing movement of the jaws to prevent distortion thereof.

In testimony whereof I have hereunto set my hand in presence of two subscribing witnesses.

THOMAS E. SILVEAR.

Witnesses:
A. W. SANS,
R. H. HUDSON.

Copies of this patent may be obtained for five cents each, by addressing the "Commissioner of Patents, Washington, D. C."